Dec. 29, 1970    W. H. VANDER HEYDEN ET AL    3,551,794
PHASE LOCKED NMR FLOWMETERING SYSTEM
Filed Feb. 5, 1968    3 Sheets-Sheet 1

INVENTORS
WILLIAM H. VANDER HEYDEN
JOSEPH H. BATTOCLETTI
BY Pendleton, Neuman
Seibold & Williams
ATTORNEYS

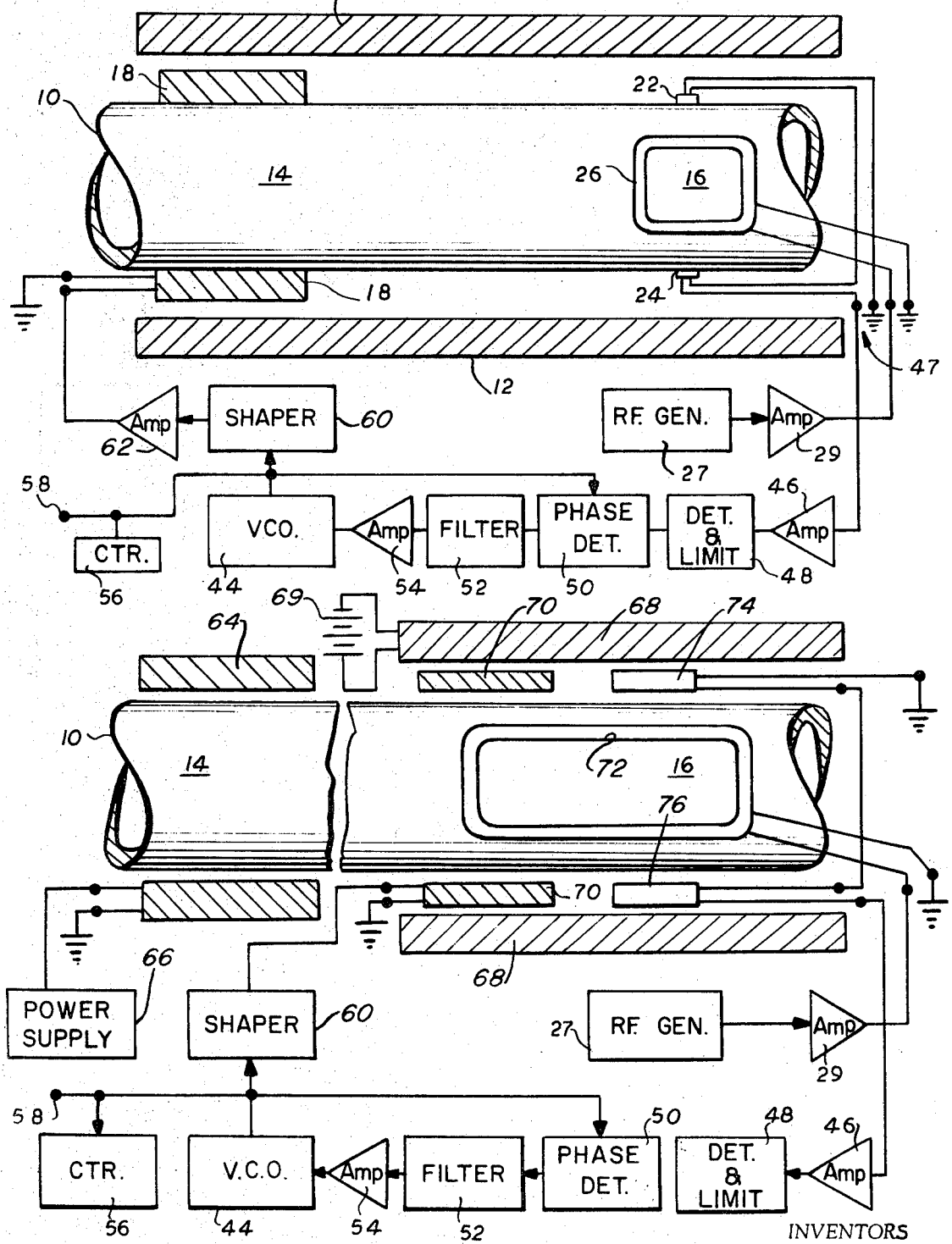

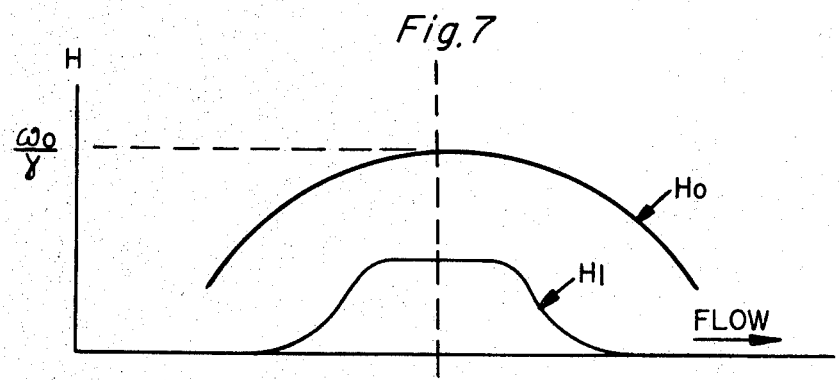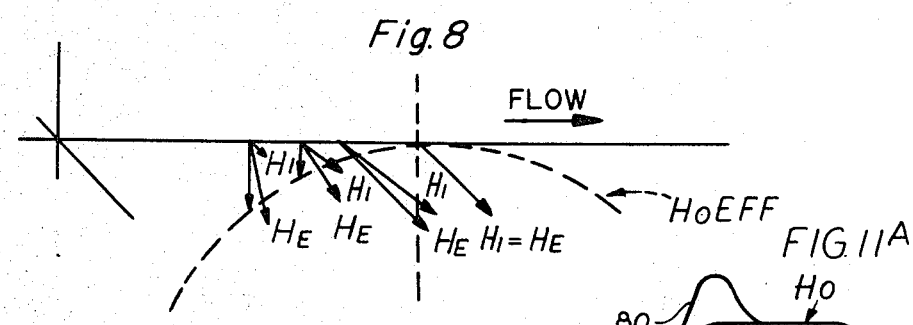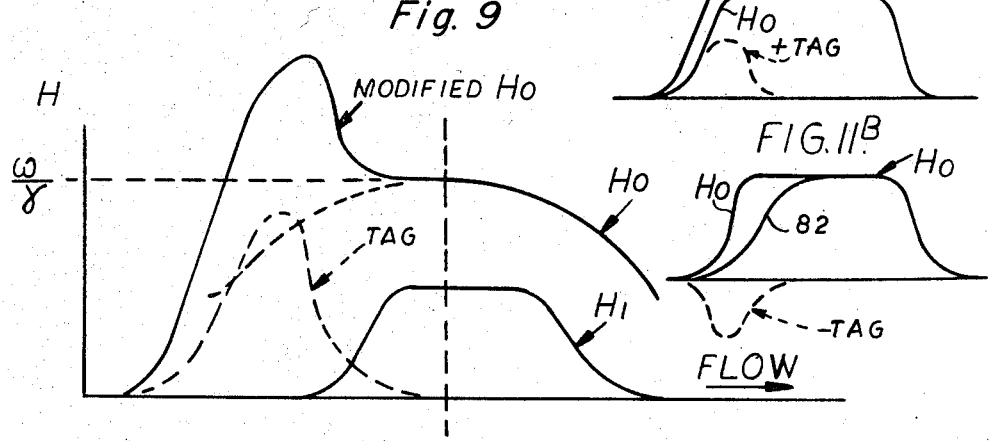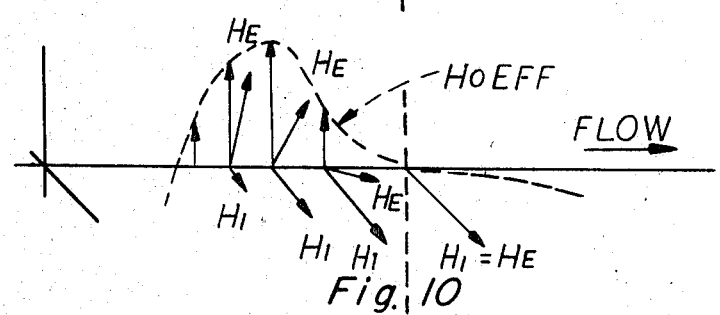

United States Patent Office 3,551,794
Patented Dec. 29, 1970

3,551,794
PHASE LOCKED NMR FLOWMETERING SYSTEM
William H. Vander Heyden, Menomonee Falls, and Joseph H. Battocletti, River Hills, Wis., assignors to Badger Meter Manufacturing Company, Milwaukee, Wis., a corporation of Wisconsin
Filed Feb. 5, 1968, Ser. No. 703,018
Int. Cl. G01n 27/70
U.S. Cl. 324—.5                                 21 Claims

ABSTRACT OF THE DISCLOSURE

This disclosure relates to NMR flowmeters, in which the fluid is magnetically tagged by being given a modulated net magnetization in a predetermined direction at a tagging station, and the magnetization level is detected at a detection station located downstream from the tagging station. A phase detector at the detection station senses the phase of the detected signal, and controls a tagging generator at the tagging station to maintain a constant phase relationship between the net magnetization at the tagging and detection stations. In one embodiment, tagging is accomplished by modulating the level of magnetization with a modulated D.C. signal applied to a magnetization coil. In another embodiment, the fluid is premagnetized and tagging is accomplished by injecting a modulated R.F. signal in a direction normal to the premagnetization direction. In still another embodiment, the fluid is premagnetized and tagging is accomplished by modifying, near the detection station, the intensity profile of a magnetic field aligned with a premagnetization direction.

---

This application relates to systems for utilizing the nuclear magnetic resonance phenomenon with paramagnetic fluids, and particularly to the application of nuclear magnetic resonance techniques to the indication and measurement of the flow of such fluids.

There are in existence several different types of NMR flowmeters which differ among each other both in construction and operation. However, all of them have in common a first means for creating a detectable nuclear magnetic characteristic within the flowing fluid, and a second means, at least part of which is located downstream from the first means, for indicating measuring or otherwise detecting the passage of the fluid, as a result of the operation of the first means. The first means in various known flowmeters may increase the amount of magnetization, if any, of the fluid, or decrease the amount of magnetism of previously magnetized fluid, and may do so on a continuous basis or by separate tagging pulses. In other systems, the magnetization of the fluid is changed in its direction instead of its amplitude. The location of the first means of all such systems will be referred to hereinafter as a "tagging" station, for its purpose is in each case to tag the fluid by affecting its nuclear magnetization in such a way that the rate of fluid flow is indicated by the time of its arrival at the second means. The location of the second means of all such systems is referred to hereinafter as a "detecting station."

The present invention is especially suitable for use with NMR systems, but may be employed wherever a modulated tagging signal is applied to the fluid at the tagging station, whether this is done by magnetic means or otherwise.

As the resolution or accuracy of any flowmeter is dependent upon the speed with which its output indication responds to changes in rate of flow, it is desirable to increase accuracy by increasing the frequency at which output information is available. In some prior systems, however, the frequency of the output information has been limited to a relatively low frequency audio signal, which, while providing a relatively good signal-to-noise ratio, has severely limited the resolution of the flowmeter. At the same time, it is desirable to achieve a good signal-to-noise ratio, and this objective tends to be impaired by widening the passband at the detection station to pass higher frequencies.

Accordingly, it is the principal object of the present invention to provide improved apparatus and methods for indicating and measuring the flow of paramagnetic fluid along a flow path, and which provides flow rate informtion at a relatively high frequency, without impairing the signal-to-noise ratio.

A further object of the present invention is to provide an NMR flow meter having improved accuracy and stability, while maintaining relative simplicity of construction and operation.

Other objects and advantages of the present invention will become manifest upon an examination of the following description and the accompanying claims and drawings.

In accordance with the present invention, there is provided a flow path for paramagnetic fluid, tagging means juxtaposed with said flow path for tagging a bolus of said fluid with a predetermined nuclear magnetic chararacteristic, detecting means juxtaposed with said flow path downstream from said tagging means for producing a continuous detected signal responsive to said nuclear magnetic characteristic, modulating means for causing said tagging means to generate a modulated characteristic in said fluid, means for comparing the phase of said modulating means with said detected signal, and feedback means for establishing a given relationship between the phase of said modulating means and the phase of said detected signal. In one embodiment of the present invention, the tagging and detecting means are interrelated, and the tagging magnetization is employed in both the tagging and detecting operation. The modulating means is designed to modfy the sign of the gradient of the magnetization along the flow path, immediately upstream from the detector or receiver coil, to cause the receiver coil to alternately produce two different signals in response to the slope of the magnetization intensity profile, the two different signals being opposite in phase.

Reference will now be made to the accompanying drawings in which:

FIG. 5 is an illustration, partly in functional block diagram form, of a second illustrative embodiment of the present invention, sometimes referred to as "D.C. injection" system;

FIG. 6 is an illustration, partly in functional block diagram form, of another illustrative embodiment of the present invention, sometimes referred to as an "inversion" system;

FIG. 7 is an illustration of one form of spatial profile of the magnetization intensity during one mode of operation of the apparatus of FIG. 6;

FIG. 8 is a three-dimensional vector diagram illustrating the magnitude of the net nuclear magnetization of the fluid within the conduit of the embodiment of FIG. 6, with the magnetization intensity profile of FIG. 7, at various positions in the flow path at a single instant of time;

FIG. 9 is an illustration of one form of the spatial profile of the magnetization intensity during a second mode of operation of the apparatus of FIG. 6;

FIG. 10 is a three-dimensional vector diagram illustrating the magnitude of the net nuclear magnetization of the fluid within the conduit of the embodiment of FIG. 6, with the magnetization intensity profile of FIG. 9, at various positions in the flow path at a single instant of time; and FIGS. 11a and 11b are illustrations of an alternative form of the spatial profile of the magnetization intensity during two different modes of operation of a modified form of the apparatus of FIG. 6.

Figure 1:
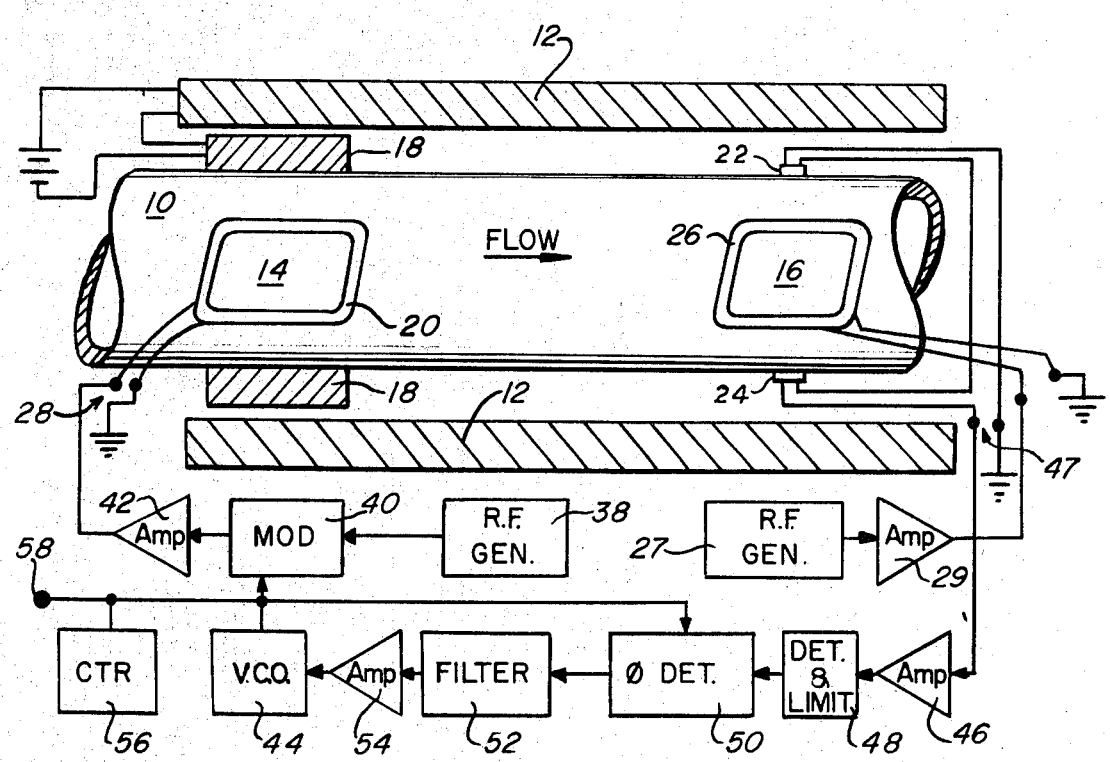
FIG. 1 is an illustration, partly in functional block diagram form, of a first illustrative embodiment of the present invention, sometimes referred to herein as an "R.F. injection" system.

Referring now to FIG. 1, there is illustrated a flow path comprising a length of conduit 10 which is preferably formed of nonmagnetic and nonconducting material such as fiber glass or the like, and which supports and confines a flow of paramagnetic fluid, such as one containing hydrogen atoms, the nuclei of which have a magnetic moment. The conduit 10 is preferably circular in cross section, and is surrounded by a circular cylindrical solenoid coil 12 for substantially its entire length, including a tagging station 14 and a detection station 16. At the tagging station 14, a second solenoid coil 18, disposed inwardly of the coil 12, surrounds the conduit 10. The coils 12 and 18 are both for the purpose of establishing a net nuclear magnetization of the fluid within the conduit 10. This magnetization is coaxially aligned with the conduit 10 and the coils 12 and 18. The coil 12 establishes a relatively uniform field, sometimes referred to hereinafter as the $H_0$ field, extending through the entire conduit 10, and the coil 18 raises the intensity of the magnetic field in the area of the tagging station 14, for a purpose to be described hereinafter.

An R.F. injection coil 20, preferably containing many turns of wire, is juxtaposed with the conduit 10 at the tagging station 14, and is oriented with its axis transverse to the direction of flow. The coil 20 may conveniently have an identical coil (not shown) connected in series with it and coaxially disposed with it on the other side of the conduit 10, so that the pair of coils produce a reinforcing magnetic field through the area of the conduit at the tagging station 14. At the detection station 16, there are disposed a pair of coils 22 and 24 connected in series-aiding relationship with each on opposite sides of the conduit 10. The coils 22 and 24 are coaxial with each other and their axis is aligned generally perpendicular to the direction of flow. An additional coil 26 is juxtaposed with the conduit 10 to produce a magnetic field through the conduit in a direction orthogonal to both the direction of flow and the axial direction of the coils 22 and 24. If desired, an additional coil similar to the coil 26 may be connected in series-aiding relationship with it on the opposite side of the conduit 10.

The coil 26 generates what will be referred to as an $H_1$ field, while the pair of coils 22 and 24 will be referred to as the receiving coil pair.

The R.F. injection coil 20, located at the tagging station 14, is a modulating coil, and its function is to change the magnetization of the fluid flowing through the conduit 10 in proportion to the amplitude of the signal applied to its terminals 28. This is done by applying to the coil 20 an electrical signal having a frequency equal to the Larmor frequency of the paramagnetic fluid at the tagging station, i.e., the frequency at which the vectors of the magnetic moments of the nuclei freely precess in the magnetic field within the conduit 10. When this occurs, the magnetic moment vectors precess about the vector of the R.F. modulating field generated by the coil 20, at a rate dependent upon the amplitude of the signal applied to the coil 20. The amplitude of the net magnetization of the fluid is decreased by this process, and the rate of decrease is proportional to the amplitude of the signal applied to the coil 20.

The magnetizing coils 12 and 18 operate to give a net nuclear magnetization to the fluid in the vicinity of the tagging station 14. If no signal is applied to the coil 20, the fluid attains a maximum nuclear magnetization. A varying or modulated signal is applied to the coil 20, however, with the effect that the magnetization of the fluid flowing past the tagging station 14 is changed in a modulated manner, such that its net nuclear magnetization is modulated in accordance with the signal applied to the coil 20. This signal is derived from an R.F. generator 38 which generates a signal having a frequency equal to the Larmor frequency for the paramagnetic nuclei within the magnetic field at the tagging station 14. The amplitude of the signal produced by the R.F. generator 38 is controlled by a modulator 40, and the resulting signal is amplified by an amplifier 42 and connected to the coil 20 via terminals 28.

It will be appreciated that the net nuclear magnetization given to the paramagnetic fluid within the conduit 10 by the coils 12 and 18 is aligned generally in parallel with the direction of flow, and the net nuclear magnetization, after being partially changed by the oscillating field of the coil 20, remains parallel to the direction of flow in the plane normal to the R.F. modulating field produced by the coil 20.

Figure 2:
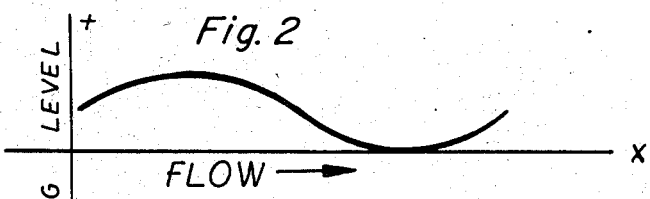
FIG. 2 is a two-dimensional vector diagram illustrating the magnitude of the net nuclear magnetization of the fluid within the conduit of the embodiment illustrated in FIG. 1, at various positions in the flow path at a single instant of time.

Referring now to FIG. 2, the amplitude of the net nuclear magnetization parallel to the direction of flow is illustrated, for the condition in which the signal applied to the coil 20 is modulated with a sine wave. As illustrated in FIG. 2, the fluid is flowing along the $x$ axis.

A voltage controlled oscillator 44, whose frequency is a function of a D.C. input voltage, is connected to the modulator 40 and furnishes the signal by which the amplitude of the R.F. modulating signal is controlled.

At the detection station, the coil 26, which is connected to a constant amplitude R.F. generator 27 through an amplifier 29, produces an R.F. field, at the Larmor frequency, perpendicular to the fields produced by coils 12 and 18. This field is hereinafter sometimes referred to as the $H_1$ field. As a result, the nuclear magnetic moments are rotated in the plane normal to the direction of the $H_1$ field, and a voltage is induced in the receiving coil pair including the coils 22 and 24, which is proportional to the net nuclear magnetization of the fluid then in the vicinity of the detection station 16. The Larmor frequency at the detection station 16 is not the same Larmor frequency as at the tagging station 14, because of the additional coil 18 disposed at the tagging station, which increases the intensity of the magnetizing field there. There is little danger of interference as a result of cross talk between the tagging station 14 and the detection station 16, because of the different frequencies employed. Also, the receiver coils 22 and 24 are preferably oriented orthogonally to the tagging coil 20, as illustrated.

The receiving coils 22 and 24, which generate the signal responsive to the amplitude of the net magnetization of the fluid, are connected via the terminals 47 through an amplifier 46 to a detector and limiter 48. In the detector and limiter 48, a constant amplitude envelope of the modulated signal detected by the receiving coils 22 and 24 is produced, which, except for a phase shift, is the same as the signal generated by a voltage controlled oscillator 44. The output of the detector and limiter 48 is connected to one input of a phase detector 50, and another input of the phase detector 50 is connected from the output of the oscillator 44. The function of the phase detector 50 is to produce an output voltage which represents an error in the phase relation of the two input signals, in reference to a predetermined phase relation.

The phase detector 50 is a demodulator by which the two input signals are multiplied, and preferably is a balanced demodulator by which the carrier frequency is suppressed from the output. If the two input signals are as $\sin(\omega t)$ and $\sin(\omega t + \theta)$, the output from the balance modulator 50 is $\frac{1}{2}[\cos\theta - \cos(2\omega t + \theta)]$.

In the above formulae, $\omega$ is the angular velocity of the two signals, and is equal for both inputs to the modulator 50 since the rate of flow within conduit 10 is substantially constant, or changes so slowly in relation to the time required for passage from the magnetization station 14 to the detection station 16 to be apparently constant. The term $\theta$ is the arbitrary phase angle resulting from the fact that the signal detected and generated by the coil 26 is the same signal as was generated at an earlier time by the coil 20. It is apparent that if the system is arranged so that $\pi = \pi/2$, the first term of the above equation vanishes. If, however, $\theta$ is some angle other than an odd multiple of $\pi/2$, the output of the phase detector 50 contains a term which is represented by a D.C. voltage. As will become apparent from the following description, the system is designed to hold the value of $\theta$ at $\pi/2$, so that the output of the phase detector is normally a sine wave having a frequency $\omega/\pi$ equal to twice that generated by the R.F. generator 27. The output of the phase detector 50 is passed through a low-pass filter 52, amplified in the amplifier 54 and applied to the control terminal of the voltage controlled oscillator 44. The low-pass filter 52 eliminates from its output any component having a frequency of $\omega/\pi$. The use of a balanced demodulator makes it unnecessary to eliminate components having a frequency of $\omega/2\pi$, which would otherwise occur. Only a D.C. voltage proportional to $\cos\theta$ is passed to the oscillator 44. This signal varies the frequency of the oscillator 44 such that a voltage representing a value of $\theta$ below $\pi/2$, operates to increase the frequency produced by the oscillator 44. Similarly, a voltage representing a value of $\theta$ above $\pi/2$ operates to decrease the frequency of the oscillator 44. Thus, if the flow velocity within the conduit 10 decreases, so that there tends to be more than a quarter wavelength, of the frequency produced by the oscillator 44, between the tagging station 14 and the detection station 16, the frequency of the oscillator 44 is increased, and vice versa, to tend to reinstate exactly one quarter wavelength between the two stations 14 and 16. The accuracy with which a quarter wavelength is maintained between the two stations is dependent upon the gain of the amplifier 54. The gain of this amplifier may be increased to any desired value in order to arrive at the desired degree of accuracy.

As the nature and construction of the individual units of the circuit of FIG. 1 are well known to those skilled in the art, they are not described herein in detail. However, the oscillator 44 is preferably a relaxation oscillator in which the output frequency is directly determined by an input control voltage, without requiring a reactance tube or the like. As pointed out hereinafter, the operation of the embodiment of FIG. 1 does not depend on the wave shape of the output of the oscillator 44.

In the mode of operation described above, one quarter of the period of the frequency of the oscillator 44 is required for the paramagnetic fluid to flow from the tagging station 14 to the detection station 16, and this relation is independent of the rate of flow of fluid. Accordingly, the frequency of the oscillator 44 must vary in direct proportion to the flow velocity within the conduit 10. The output of the oscillator 44 is connected to a counter 56, which counts the number of cycles produced by the oscillator 44 during any given interval, to arrive at the total quantity of fluid which has flowed through the conduit 10 during that interval.

A terminal 58 is also connected to the output of the oscillator 44, and a frequency meter or the like may be connected to this terminal to give a direct indication of the instantaneous rate of flow of fluid within the conduit 10.

If the oscillator 44 produces a sine wave output, to generate a net nuclear magnetization spread along the conduit 10 as illustrated in FIG. 2, the counter 56 preferably includes a pulse shaper such as a Schmitt trigger or the like in order to actuate the counter 56 without ambiguity. Alternatively, the counter 56 may contain a synchronous motor, the armature of which rotates synchronously at a speed proportional to the frequency of the oscillator 44. A mechanical meter connected to the armature shaft then indicates total flow directly.

Figure 3:
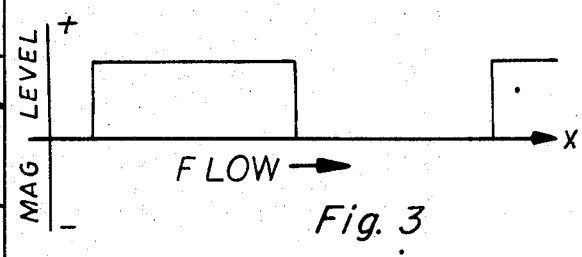
FIG. 3 is a two-dimensional vector diagram similar to FIG. 2, but illustrating the spatial relation of the magnetization of the fluid when a square wave modulating signal is employed in the embodiment of FIG. 1.

The oscillator 44 may be a square wave oscillator, in which case the net nuclear magnetization vector of fluid flowing along the $x$ axis is illustrated in FIG. 3. The net nuclear magnetization vector of the fluid has alternate sequences of equal length along the conduit, which have substantially constant magnetizations of different levels. The operation of the phase detector 50, in such a case, is identical to that described above, namely, no D.C. signal is produced at the output if the two input signals are separated by 90° of phase (i.e., $\theta = \pi/2$). The same is true if the output of the oscillator 44 has a duty cycle other than the 50% of an ordinary square wave. The wave shape of the oscillator is not critical.

It will be apparent that in the operation of the embodiment of FIG. 1, the instantaneous frequency of the oscillator 44 continuously represents flow velocity, and this information is available on a continuous basis rather than the intermittent basis characteristic of the prior art detection systems. The moment the flow rate changes, after only the short duration required for fluid to flow between the two stations, the phase of the two inputs of the phase detector 50 tends to change, and a very small output from the phase detector 50 rapidly changes the frequency of the oscillator 44 to reflect the change in flow rate.

In addition, the use of the phase detector 50 attains maximum resolution because of the wide bandwidth of its input, while the subsequent low-pass filter 52 achieves maximum noise immunity. In this connection the amplifier 46, and the detector and limiter 48, have wide pass bands.

The degree of modulation of the signal produced by the R.F. generator 38 is preferably 100%; that is, the amount of variation of the nuclear magnetization of the fluid is from a minimum (at which the fluid remains fully polarized) to a maximum at which there is sensibly no detected output at the detection station. This condition helps to maximize the signal-to-noise ratio of the system.

In the embodiment illustrated in FIG. 1, the tagging nuclear magnetization is in a direction parallel to the direction of fluid flow. This is a convenient arrangement, for cylindrical solenoid coils such as the coils 12 and 18 may be employed to generate substantially uniform fields within the conduit 10. Alternatively, permanent magnets may be employed to generate the axial field.

The $H_0$ field and magnetization may, however, be made transverse to the direction of flow by a different arrangement of coils, preferably aided by a ferromagnetic core to concentrate magnetic flux in a direction normal to the axis of flow. For example, a horseshoe magnet may be employed with the conduit located midway between the two legs of the horseshoe. Such a magnet may be either permanent or electrically powered by a coil. When such a direction is used, the R.F. modulating field may be disposed in either orthogonal direction. At the detection station, the $H_1$ field coil is oriented so that the $H_1$ field is oriented perpendicularly with the $H_0$ field, and the receiving coils are orthogonal with the $H_1$ field coil and the $H_0$ field.

The apparatus of FIG. 1 may also optionally be provided with means for rapidly modulating the frequency of the R.F. generator 38, over a small range, to compensate for inhomogeneity of the $H_0$ field in the region of the detection station 16, which would cause a variation in the Larmor frequency. Alternatively, the generator 38 may take the form of a noise source for generating a continuous band of frequencies on both sides of the designed Larmor frequency, to accommodate the field inhomogeneity. The output of the noise source would be connected through a filter, which would pass only the desired band of frequencies.

Figure 4:
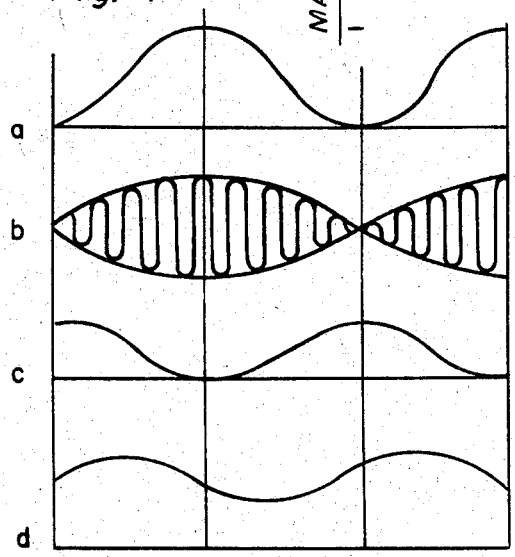
FIG. 4 is a diagram of certain waveforms obtained during operation of the apparatus of FIG. 1.

FIG. 4 is a diagram of certain waveforms obtained during the operation of the apparatus of FIG. 1. Waveform $a$ in FIG. 4 is the envelope of the modulated magnetization vectors of the fluid flowing in the conduit 10, and waveform $b$ is the signal detected by the receiving coils 22 and 24. The output of the detector and limiter 48 is illustrated in waveform $c$, and waveform $d$ is the output of the oscillator 44, which is 90° out of phase with waveform $c$. In this condition, the output voltage of the filter 52 and the amplifier 54 is at a minimum, and no change is induced in the frequency of the oscillator 44. If the phase difference is not 90°, a voltage is produced at the output of the amplifier 54 such voltage having the proper sign to bring about a change in the frequency of the oscillator 44 until the phase difference again becomes 90°.

Although the R.F. injection system of FIG. 1 employs a change in the magnetization as the tagging mechanism, this is not necesary to the present invention. The fluid may instead be tagged by the application of a modulated electric current to the coil 18, whereby the amplitude of the nuclear magnetization is modulated. This is the manner of operation of the D.C. injection system of FIG. 5, which will now be described.

The components of the D.C. injection system of FIG. 5 are similar to those of the R.F. injection system of FIG. 1, except no R.F. injecting coil is required, and the output of the voltage controlled oscillator 44 is applied, through a shaper 60 and an amplifier 62, to the magnetizing coil 18. Components which correspond with similar components in the embodiment of FIG. 1 are identified with corresponding reference numerals. The shaper 60 shapes the output of the V.C.O. 44 into a square wave, and alternate half cycles of the square wave are applied through the amplifier 62 to energize the coil 18. As a result, the coil 18 generates a unidirectional polarizing field in the form of a square wave, and tags the fluid in the manner illustrated in FIG. 3. In other respects, the operation of the embodiment of FIG. 5 is the same as has been described for that of FIG. 1. The embodiment of FIG. 5. has a lower power requirement than that of FIG. 1 under certain conditions such as (for example, use with paramagnetic fluids having a relatively short longitudinal relaxation time.

While both of the R.F. injection and the D.C. injection systems are eminently suitable for use with flowmeters, in both of them the magnitude of the signal detected at the receiving coil varies between zero and a maximum value. In the inversion system embodiment of FIG. 6, however, all of the fluid flowing through the conduit is tagged by being given one of two discrete magnetic tags, having opposite signs, so the receiver apparatus detects an amplitude varying from a maximum value of one sign to a maximum value of the opposite sign, which is therefore twice the amplitude realized in the R.F. injection and D.C. injection systems.

The embodiment of FIG. 6 employs a pre-polarizing coil 64, located upstream from the other components of the flowmeter, which coil is constantly energized by a D.C. power supply 66, thereby creating a constant unidirectional magnetic field within the conduit 10.

Both tagging and detection take place downstream from the pre-polarizing coil 64, where there is located an elongated solenoid coil 68, which has a relatively large inside diameter relative to the conduit 10 and surrounds the latter. A D.C. source 69 powers the coil 68. At the upstream end of the coil 68 is located a coaxial solenoid coil 70 which is relatively short in length and is wound closely about the conduit 10. An $H_1$ coil 72 is mounted on the conduit 10, with its center downstream from the coil 70. The coil 72 is preferably connected in series with a similar coil (not shown) disposed on the opposite side of the conduit 10 in field-reinforcing relationship. About the center of the coil 72, or slightly downstream from the center of the coil 72, a pair or receiving coils 74 and 76 are disposed, in orthogonal relationship with the coils 68 and 72. The circuitry connected with the $H_1$ coil 72 and the receiving coils 74 and 76 is similar to that connected with the corresponding coils of FIG. 5 (viz, the $H_1$ coil 26 and the receiving coils 22 and 24), and are identified with corresponding reference numerals. In the embodiment of FIG 6, however, the shaper 60 is connected with the coil 70, which coil is hereinafter referred to as a tagging coil.

In the embodiment of FIG. 6, a nonuniform $H_0$ field is employed, and the $H_1$ field may also be nonuniform. During one period of the operation of the system, the intensity of the $H_0$ field generated by the coil 68 is illustrated in FIG. 7. The profile of the $H_0$ field intensity, with respect to the distance S along the conduit, is generally in the shape of a bell-shaped curve. The profile of the $H_1$ field is substantially constant in the vicinity of the maximum $H_0$ field intensity, but sharply reduces to a very small amplitude just upstream from where the maximum value of the $H_0$ is reached. Indeed, the $H_1$ intensity profile may actually pass through zero and become negative further upstream, but then declines to zero where the $H_0$ field still has an appreciable intensity.

The $H_0$ field intensity, at its maximum, is nearly equal to $\omega_0/\gamma$, so at that position the effective magnetic field $H_E$ is in substantial alignment with $H_1$, $H_E$ being the vector sum of the $H_1$ field and $$\left(H_0 - \frac{\omega}{\gamma}\right)$$

where the latter term is the effective component of the $H_0$ field for any regular velocity $\omega$ of the $H_1$ and for any gyromagnetic ratio of the fluid flowing through the conduit. This is illustrated in FIG. 8, where $H_E$ is seen to be collinear with $H_1$ at the maximum $H_0$ intensity. In the region of maximum intensity, the $H_1$ field intensity is essentially constant.

During certain periods of operation of the system, the tagging coil 70 is energized, to give the $H_0$ field intensity profile a sharply peaked profile slightly upstream from the region of maximum $H_0$ intensity as illustrated in FIG. 9. From the peak, the $H_0$ intensity declines until it is about equal to the maximum intensity of the unmodified $H_0$ field, after which it follows the normal $H_0$ curve as illustrated in FIG. 7. This gives the $H_0$ field a profile modified by the tagging coil 70, which rises sharply to a value much greater than $\omega_0/\gamma$ while the intensity of the $H_1$ field is essentially zero, and which falls throughout the region where the $H_1$ field is substantially uniform until it rejoins the unmodified $H_0$ characteristic. The effect of this operation on $H_E$ is illustrated in FIG. 10.

It is important that the rate of change of $H_0$ eff. field intensity during the interval immediately upstream from the center of the receiving coils 74 and 76 be adiabatic, or in other words, the rate of change of the $H_0$ eff. vector is small compared to $\gamma H_1^2$. This condition appears to be satisfied for the apparatus of the present invention at flow rates up to 8,000 feet per second, as long as the switching time (i.e. the time required to change from the profile of FIG. 7 to that of FIG. 9) is at least 380 microseconds.

When only the normal profile of the $H_0$ field is present, the paramagnetic nuclei which enter the region of the coil 68 (and which have their magnetic moment vectors aligned in parallel with the $H_0$ field) proceed through the portion of the $H_0$ field in which the intensity is gradually increasing, until the upstream edge of the $H_1$ profile is reached.

At this point, the $H_0$ field intensity is much less than $\omega_0/\gamma$ so that the effect of the $H_1$ is negligible, as shown in FIG. 8. As the nuclei proceed toward the center of the coil 68, however, the $H_0$ field intensity approaches $\omega_0/\gamma$ so that the amplitude of the component of the effective field aligned with the $H_0$ field approaches zero, and $H_E$ becomes aligned, and equal to $H_1$ (FIG. 8). As indicated previously, this rotation is adiabatic so that substantially all of the nuclei have been brought into alignment with the $H_1$ direction after this region of the tagging station has been passed.

When the auxiliary $H_0$ coil is energized, the profile of the $H_0$ field changes from that shown in FIG. 7 to that shown in FIG. 9, while fluid continues to flow through the conduit. With the modified $H_0$ profile, the magnetic moment vectors of the nuclei tend to be shifted by the $H_1$ field, as the nuclei flow past the region of sharply increasing $H_0$ field intensity, when $H_0 = \omega_0/\gamma$, but the shift is small (because of the low intensity of the $H_1$ field in this region), and as the shift is effective only during the time when $H_0 = \omega_0/\gamma$, the orientation of the nuclei is virtually unaffected by the passage of the $H_0$ field amplitude through the value $\omega_0/\gamma$. Thereafter, the value of the $H_0$ field decreases adiabatically until the $H_0$ field is approximately equal to $\omega_0/\gamma$ in the region corresponding to the maximum intensity of the unmodified $H_0$ field. When this occurs, $H_E$ is aligned with $H_1$ just as before, as illustrated in FIG. 10. However, as the slope of the $H_0$ field profile is negative in the immediately preceding region, the rotation of the magnetic moment vectors of the individual nuclei is in the opposite direction from that obtained with the positive slope profile of the unmodified $H_0$ field profile. Thus, the individual nuclei become aligned antiparallel with the $H_1$ field and antiparallel to the nuclei which had previously been tagged with the unmodified $H_0$ profile. Nuclei which are tagged with the profiles of FIGS. 7 and 9 consequently produce signals of opposite sign in the receiver coils 74 and 76. Accordingly, by switching the profile of the $H_0$ field from its normal, unmodified profile to its modified, peaked profile, the nuclei may be tagged continuously in reverse senses, and represent a square wave with both the positive-going and negative-going half-cycles tagged with maximum amplitude.

In energizing the auxiliary coil, to change the profile from the normal to the peaked shape, it is necessary to maintain adiabaticity, or else the magnetic moment vectors of the nuclei become randomized and no coherent tag is applied. Non-adiabaticity results in a decrease in the amount of information available at the detection station, which is the opposite of the effect desired.

The tagged boluses produced by the inversion system of the present invention may be detected at the detection station with any of the well-known detection schemes, but it is preferable to employ the profile gradient system disclosed and claimed in the copending McCormick application Ser. No. 673,780, filed Oct. 9, 1967 for NMR Detection Methods and Apparatus. In the profile detection system, as described in that application the intensity of the $H_0$ field is offset slightly from $\omega_0/\gamma$, and this eliminates the need for precise control over the $H_0$ field intensity and the frequency of the $H_1$ field.

As shown in FIG. 9, there is very little overlap between the field produced by the auxiliary coil and the $H_1$ field. This overlap may be greater however, and it has been found that the highest fluid flow rate may be accommodated without impairment of adiabaticity by permitting these fields to overlap to the extent that the distance from the upstream end of the $H_1$ field to the point where the two fields are equal is about 70% of the distance from the upstream end of the $H_1$ field to the point where the $H_1$ field assumes its constant, maximum value.

The principal advantages of the inversion phase lock system is that short inter-coil distances may be employed, and its operation effectively doubles the amplitude of output at the receiver, thereby imposing less of a power requirement in the tagging means. In addition, the problems associated with the selection of the correct R.F. modulating or (Larmor) frequency employed in the embodiment of FIG. 1 is avoided by the inversion scheme, which may employ the profile detection system described in the McCormick application referred to above. In addition, the same $H_1$ field generator may be employed for both tagging and detecting, so that no additional R.F. generators are required for tagging, beyond those which would normally be used, in any event for detecting. The inversion scheme is also less sensitive to drifts and shifts in both the frequency of the R.F. generators, and the amplitude of the $H_0$ fields. This reduces the need for stabilizing equipment which would otherwise be required to stabilize the amplitude of the field and regulate the frequency of the R.F. generator.

Although the inversion phase lock system of FIG. 6 has been described as having a nonuniform $H_0$ field, as illustrated in FIGS. 7–10, the $H_0$ field may alternatively be substantially uniform, and the tagging coil 70 energized alternately in opposite directions to bring about the required change in profile of the combined $H_0$ field.

The profiles of the $H_0$ field produced by such an operation are shown in FIGS. 11a and 11b. In FIG. 11a, the tagging field is in one direction, arbitrarily designated positive with the combined field in the $H_0$ direction having the profile 80. In FIG. 11b, where the tagging field is negative, the combined field has the profile 82. These correspond respectively to the profiles illustrated in FIGS. 9 and 7.

In all of the above embodiments, $H_0$ has been indicated to be parallel to the conduit. It is possible, however, to arrange the various fields so that the $H_0$ direction is perpendicular to the conduit, as long as the fields described to be in orthogonal relationship with the $H_0$ field maintain the same relative attitudes. The steady fields may be produced by solenoids as shown, or by electromagnets or permanent magnets without departing from the present invention.

By the foregoing, an illustrative embodiment of the present invention has been described with such detail as to enable others skilled in the art to make and use the same and, by applying current knowledge, to adapt the same for use under varying conditions of service, without departing from the essential features of novelty of the present invention, which are intended to be defined and secured by the appended claims.

What is claimed is:

1. A flowmeter comprising a flow path for conducting a flow of paramagnetic fluid sequentially past a tagging station and detection station, generating means for generating an oscillatory signal, tagging means juxtaposed with said flow path at said tagging station and connected to said generating means for causing a portion of said paramagnetic fluid to assume a magnetic polarization in response to said oscillatory signal, wherein the instantaneous magnetic polarization of the fluid at said detecting station is dependent on the rate of flow of said fluid, detecting means juxtaposed with said flow path at said detection station for producing an output signal responsive to the instantaneous magnetic polarization of the fluid at said detection station, and regulating means connected to said generating means and to said detection means for regulating the frequency of said oscillatory signal responsive to the difference between the phase of said oscillatory signal and the phase of said output signal to maintain a constant phase difference between said oscillatory signal and said output signal.

2. Apparatus according to claim 1, wherein said regulating means comprises a phase detector connected to said generating means and to said detection means for detecting a phase difference between said oscillatory signal and said information signal, and control means responsive to the output of said phase detector for regulating the frequency of said oscillatory signal to establish a predetermined relation between the phase of said oscillatory signal and the phase of said output signal.

3. Apparatus according to claim 2, wherein said phase detector comprises a balanced modulator.

4. Apparatus according to claim 2, including a low-pass filter interconnected between said phase detector and said generating means.

5. Apparatus according to claim 1, including a counter connected to the output of said generating means for manifesting the number of cycles of said oscillatory signal generated by said generating means within a time interval, said number being proportional to the total quantity of fluid flowing in said path during said interval.

6. Apparatus according to claim 1, including means for generating a substantially constant unidirectional field within an area of said flow path including said tagging station and said detection station.

7. Apparatus according to claim 6, including means for modifying the intensity of said unidirectional field in the vicinity of one of said stations, whereby the Larmor frequency of the paramagnetic fluid is substantially different at the two stations.

8. Apparatus according to claim 1, wherein said tagging means comprises means for generating a substantially constant unidirectional field within the fluid at said tagging station, means for generating a magnetic field alternating at the Larmor frequency of said fluid at said tagging station, in a direction transverse to said unidirectional field, and including means for modulating said field generating means to modulate the degree of saturation of the paramagnetic fluid at the detection station.

9. Apparatus according to claim 1, wherein said detection means comprises means for generating a constant unidirectional field within said flow path, means for generating a constant amplitude, alternating field at the Larmor frequency within the flow path at said detection station, and means for continuously detecting the relative amplitude of magnetization of the fluid within the flow path at said detection station.

10. Apparatus according to claim 1, including means for polarizing said fluid in advance of said tagging station, means for generating a unidirectional magnetic field at said tagging station in parallel with the polarized direction, and selectively operable means for increasing the intensity of said field, said last named means being connected to said generating means to produce, on alternate half cycles of said oscillatory signal, a magnetic field intensity profile which is decreasing in the vicinity of said detection station, said half cycles being separated by alternate half cycles in which said field intensity is increasing in the vicinity of said detection station.

11. Apparatus according to claim 10, including radio frequency generator means for producing a relatively constant magnetic field within the vicinity of said detection station said generator having a frequency nearly equal to the Larmor frequency of said fluid, whereby the gyromagnetic vectors of the nuclei within said paramagnetic fluid assume opposite orientations in response to the sign of the gradient of said unidirectional field in the vicinity of said detection station.

12. Apparatus according to claim 10, including selectively operable means for decreasing the intensity of said field, said last named means being connected to said generating means to produce a magnetic field intensity profile which is increasing in the vicinity of said detection station, means for operating said means for selectively increasing the field intensity and said means for selectively decreasing said field intensity on alternate half cycles of said oscillatory signal.

13. In a flowmeter having a flow path for conducting a flow of paramagnetic fluid past a tagging station and a detection station and means at said tagging station for giving said fluid a constant unidirectional premagnetization, the combination comprising means for establishing a unidirectional magnetic field within said flow path at said detection station aligned in parallel with the direction of said premagnetization and increasing in intensity in the direction of said flow, means for establishing an alternating field within said flow path at said detection station normal to said unidirectional field and having a frequency about equal to the Larmor frequency of paramagnetic nuclei of said fluid at the field intensity of said unidirectional field in the region where it is crossed by said alternating field, selectively operable tagging means for generating a second unidirectional field aligned in parallel with the first unidirectional field and decreasing in intensity substantially to zero in said region, whereby paramagnetic nuclei within said fluid are caused to rotate from the direction of premagnetization toward alignment with the direction of said alternating field in one direction when said selectively operable means is not operated and in the opposite direction when said selectively operable means is operated, and detecting means disposed outside said flow path at said detecting station for detecting said rotation and for producing an output signal in response thereto to indicate when said fluid is flowing within said flow path.

14. Apparatus according to claim 13, including means for operating said tagging means in response to the output of said detecting means.

15. Apparatus according to claim 13, wherein said selectively operable means comprises means for generating said second field when said selectively operable means is operated and means for generating a third field, having the same intensity profile as said second field, but directed oppositely thereto.

16. The method of metering a flowing fluid having paramagnetic properties comprising impressing a cyclically varying magnetic polarization on said fluid as it flows past a first station along its flow path, sensing the resulting varying magnetic polarization of said fluid at a second station disposed along said flow path at a predetermined distance from said first station, comparing the phase of the magnetic polarization impressed on said fluid with the phase of the magnetic polarization sensed at said second station, varying the frequency of the cyclical application of the magnetic polarization at said first station in response to said comparison to maintain a predetermined phase relationship between the impressed magnetic polarization and the sensed magnetic polarization, and registering the variations of said impressed magnetic polarization to determine the flow of said fluid along said flow path between said stations.

17. A method as in claim 16 including registering the frequency of the cyclical application of the magnetic polarization to determine the flow velocity.

18. The method of metering a flowing fluid having paramagnetic properties comprising impressing a net unidirectional nuclear magnetization on said fluid as it flows past a first station along its flow path, subjecting spaced boluses of said fluid to a unidirectional magnetic field which is parallel with said unidirectional magnetization of said fluid and which increases in intensity in the direction of flow in a region of said flow path downstream from said first station and subjecting intervening boluses of said fluid to a unidirectional magnetic field which is parallel with said unidirectional magnetization and which decreases in intensity in the direction of flow in said region, applying an alternating magnetic field to said boluses as they pass through said region, said alternating field being applied normal to said unidirectional magnetization of said fluid and at a frequency approximating the Larmor frequency of said fluid in said region, thereby rotating the net directinal magnetization of the fluid in the boluses subjected to said increasing field from the direction of initial magnetization toward alignment with said alternating field in one direction and rotating the net directional magnetization of the fluid in the boluses subjected to said decreasing field from the direction of initial magnetization toward alignment with said alternating field in the opposite direction and detecting the passage of said boluses at a detection station downstream from said region, the space between said boluses being a function of the rate of flow of said fluid.

19. A method as in claim 18 including detecting the variations in magnetization of said fluid passing said detecting station, varying the period of application of such increasing field and the period of application of such decreasing field in said region to maintain a predetermined phase relationship between such applications and the resulting variations in magnetization of said fluid as detected at said detection station ,and registering the variations in the frequency of alternation between such applications to determine the rate of flow of said fluid along said flow path between said stations.

20. A method as in claim 18 wherein said increasing and decreasing fields are increased and decreased, respectively, to the same predetermined magnetic field strength.

21. A method as in claim 18 wherein a constant unidirectional magnetic field increasing in intensity in the direction of flow is applied in said region to provide said field of increasing intensity and an additional unidirectional magnetic field parallel with said constant field is periodically applied with said constant field in said region to provide said field of decreasing intensity.

References Cited
UNITED STATES PATENTS 3,419,793 12/1968 Genthe _____ 324—0.5
3,419,795 12/1968 Genthe _____ 324—0.5

RUDOLPH V. ROLINEC, Primary Examiner

M. J. LYNCH, Assistant Examiner

U.S. Cl. X.R.

73—194

UNITED STATES PATENT OFFICE
CERTIFICATE OF CORRECTION

Patent No. 3,551,794            Dated     December 29, 1970

Inventor(s) WILLIAM H. VANDER HEYDEN - JOSEPH H. BATTOCLETTI

It is certified that error appears in the above-identified patent and that said Letters Patent are hereby corrected as shown below:

Column 2, line 67, insert "a" after -- as --;

Column 3, line 44, "injection" should be -- injecting --;

Column 5, line 22, "$\pi = \pi/2$" should be -- $\theta = \pi/2$ -- ;

Column 7, line 55, "(" should be -- , --;

Column 8, line 45, "regular" should be -- angular --;

Signed and sealed this 27th day of April 1971.

(SEAL)
Attest:

EDWARD M. FLETCHER, JR.        WILLIAM E. SCHUYLER, JR.
Attesting Officer              Commissioner of Patents